T. ROSS.
COMBING MACHINE.
APPLICATION FILED JUNE 2, 1920.
1,407,170.
Patented Feb. 21, 1922.
2 SHEETS—SHEET 1.
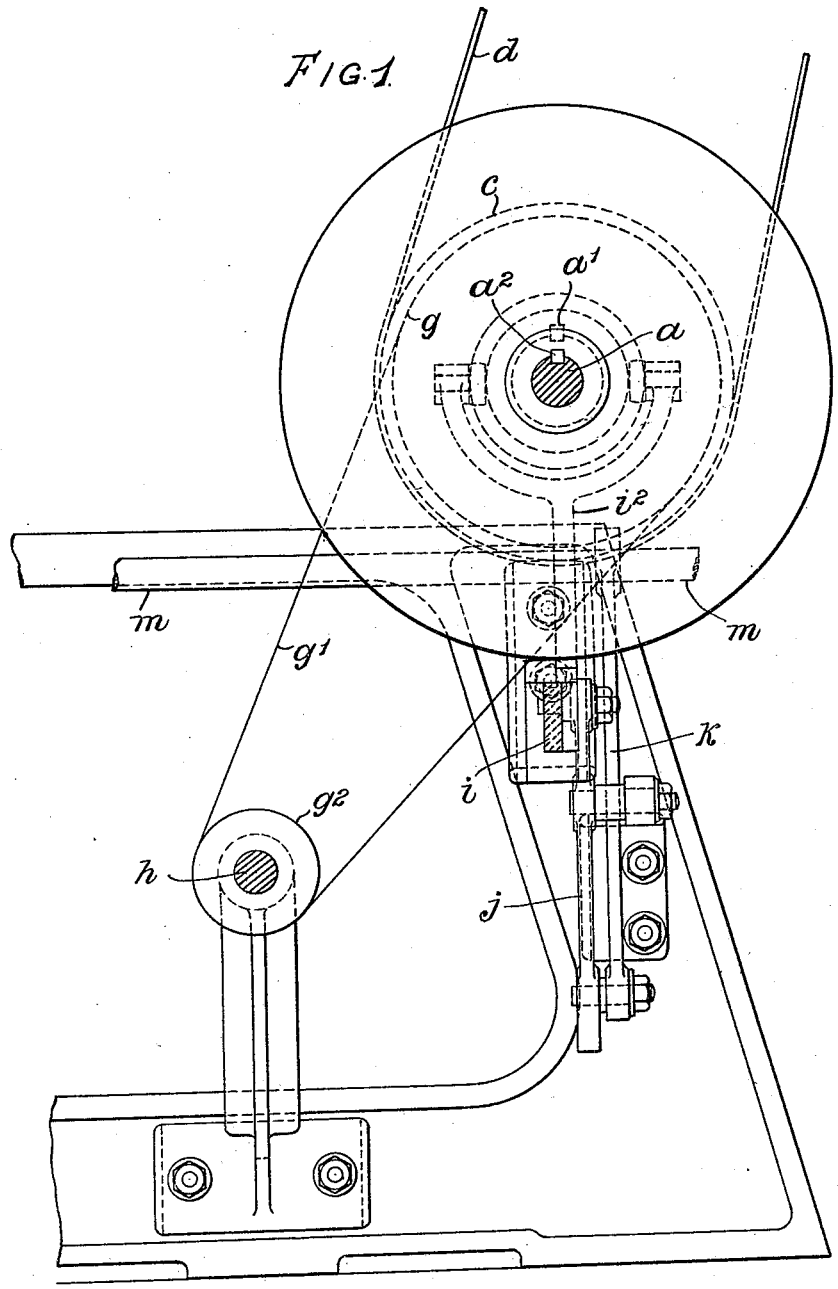
INVENTOR:
Thomas Ross
BY Wm Wallace White
ATTY.

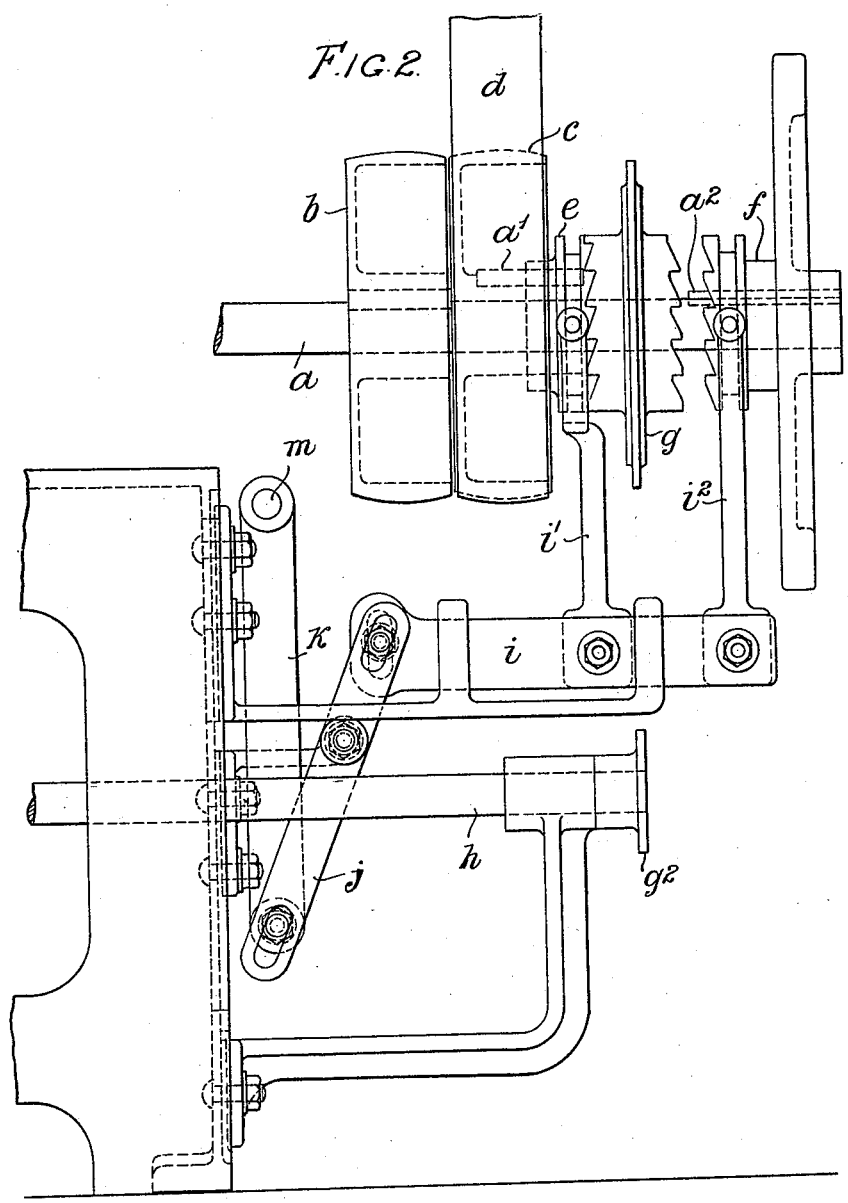

UNITED STATES PATENT OFFICE.

THOMAS ROSS, OF PRESTWICH, NEAR MANCHESTER, ENGLAND, ASSIGNOR TO JOHN HETHERINGTON AND SONS LIMITED, OF MANCHESTER, ENGLAND.

COMBING MACHINE.

1,407,170. Specification of Letters Patent. Patented Feb. 21, 1922.

Application filed June 2, 1920. Serial No. 386,128.

*To all whom it may concern:*

Be it known that I, THOMAS ROSS, a subject of the King of Great Britain, residing at 40 George Street, Prestwich, near Manchester, in the county of Lancaster, England, have invented new and useful Improvements in Combing Machines, of which the following is a specification.

My invention relates to improvements in combing machines of the type in which a fan or aspirator as described in Roth's British Patent Specification No. 5124 of 1907 is applied for removing the waste from the cylinder brushes.

In combing machines of this type it has been usual for the fan or aspirator to stop when the combing elements of the machine are stopped.

In practice, however, it has before been proposed in a combing machine of the indicated type, to drive the fan continuously and irrespective of the combing elements by means of a loose pulley and clutch.

Further the same result has been effected by the invention described in prior British Patent Specifications Nos. 101610 and 116060.

My present invention relates to an improved arrangement of driving mechanism having the same objects as those covered by the said prior British Patents Nos. 101610 and 116060 but characterized by the use of clutches in combination with a single pair of fast and loose pulleys and suitable connections from the stop rod.

I illustrate my invention in the accompanying two sheets of drawings, in which—

Fig. 1 is an end elevation and Fig. 2 a front elevation of my improved arrangement of driving mechanism as applied for driving the fan or aspirator shaft.

In these views, $a$ designates the driving shaft, $b$ the fast and $c$ the loose pulleys mounted thereon; and $d$ the driving strap or belt. The loose pulley $c$ is hollow and on a feather key $a'$ on its boss is mounted a half clutch $e$. A combined half clutch and fly wheel $f$ is fitted to slide on a feather key $a^2$ on the shaft $a$ and between the two half clutches $e$ and $f$ is mounted a combined double clutch member and sprocket wheel $g$ which is geared by the chain $g'$ to a second sprocket wheel $g^2$ fixed on the fan shaft $h$.

Two pairs of clutch forks $i'$ $i^2$ respectively are fixed on a sliding guide bar $i$ which is actuated by a lever $j$ and arm $k$ fixed on the stop rod $m$ so that by operating the stop rod and sliding the guide bar $i$ in either direction either half clutch member $e$ or $f$ can be caused to engage the double clutch member $g$ which is fixed in position on the rotating driving shaft $a$.

From the foregoing it will be obvious that when the driving strap $d$ is on the fast pulley $b$ and the driving shaft $a$ is rotating that the combing elements will be in full operation and if the half clutch $f$ is in gear with the double clutch member $g$ the fan or aspirator shaft $h$ will also be driven by the chain $g'$. If, however, the driving belt $d$ is shifted on to the loose pulley $c$ both the machine and the fan will remain stationary unless the half clutch member $e$ be moved into gear with the double clutch member $g$ which will then be driven and through the chain gear also drive the fan or aspirator shaft $h$.

It will therefore be obvious that at any time the fan or aspirator can be stopped by disengaging both the half clutch member $e$ and $f$ from the double clutch member $g$.

What I claim as my invention and desire to secure by Letters Patent is:—

1. A combing machine comprising, in combination, a shaft having fast and loose pulleys mounted thereon, a sprocket wheel loosely mounted on said shaft and having clutch faces at each side, a fan shaft, a sprocket wheel mounted thereon, a chain connecting said sprocket wheels, a clutch member slidably keyed to the loose pulley for engagement with one of said clutch faces, a clutch member slidably keyed to the shaft for engagement with the other clutch face, and means for engaging one or other of said clutch members with the sprocket wheel or disengaging both.

2. A combing machine comprising, in combination, a shaft having fast and loose pulleys mounted thereon, a sprocket wheel mounted on said shaft and having clutch faces constituting a main clutch member, a fan shaft, a sprocket wheel mounted thereon, a sprocket chain connecting said sprocket wheels, a sliding guide bar, a pair of clutch forks mounted thereon, a pair of half clutch members slidably mounted on the same shaft as the main clutch member and adapted to be moved by said forks, a stop rod for moving said guide bar for throwing either of said half clutch members into engagement with the main clutch member or disengaging both members, to effect control of the fan shaft independently of the driving belt on the pulleys.

3. A combing machine comprising, in combination, a shaft having fast and loose pulleys mounted thereon, a sprocket wheel mounted on said shaft and having clutch faces constituting a main clutch member, a fan shaft, a sprocket wheel mounted thereon, a sprocket chain connecting said sprocket wheels, a sliding guide bar, a pair of clutch forks mounted thereon, a pair of half clutch members one slidably keyed on the same shaft as the main clutch member, and the other slidably keyed on the boss of the loose pulley and both adapted to be moved by said forks, a stop rod for moving said guide bar for throwing either of said half clutch members into engagement with the main clutch member or disengaging both members, to effect control of the fan shaft independently of the driving belt on the pulleys.

In testimony whereof I have signed my name to this specification.

THOMAS ROSS.

Witnesses:
C. H. WHITE,
HERBERT ROWLAND ABBEY.